United States Patent
Birke

(10) Patent No.: US 9,776,867 B2
(45) Date of Patent: Oct. 3, 2017

(54) PROCESS AND APPARATUS FOR PREPARATION OF NITRIC ACID

(71) Applicant: Daniel Birke, Dortmund (DE)

(72) Inventor: Daniel Birke, Dortmund (DE)

(73) Assignee: THYSSENKRUPP INDUSTRIAL SOLUTIONS AG, Essen (DE)

( * ) Notice: Subject to any disclaimer, the term of this patent is extended or adjusted under 35 U.S.C. 154(b) by 88 days.

(21) Appl. No.: 14/367,368

(22) PCT Filed: Nov. 30, 2012

(86) PCT No.: PCT/EP2012/004948
§ 371 (c)(1),
(2) Date: Jun. 20, 2014

(87) PCT Pub. No.: WO2013/091770
PCT Pub. Date: Jun. 27, 2013

(65) Prior Publication Data
US 2015/0004091 A1    Jan. 1, 2015

(30) Foreign Application Priority Data
Dec. 22, 2011    (DE) .......................... 10 2011 122 142

(51) Int. Cl.
*C01B 21/38*    (2006.01)
*C01B 21/36*    (2006.01)
(Continued)

(52) U.S. Cl.
CPC .................. *C01B 21/38* (2013.01); *B01J 7/00* (2013.01); *C01B 21/26* (2013.01)

(58) Field of Classification Search
CPC ............. C01B 21/38; C01B 21/26; B01J 7/00
See application file for complete search history.

(56) References Cited

U.S. PATENT DOCUMENTS

| 3,567,367 A | 3/1971 | Kandell et al. |
| 3,715,887 A | 2/1973 | Weatherly et al. |

(Continued)

FOREIGN PATENT DOCUMENTS

| DE | 102 11 964 A1 | 10/2003 | |
| GB | 807885 A | * 1/1959 | .......... B01J 19/0013 |

OTHER PUBLICATIONS

English Translation of International Search Report for International Patent Application No. PCT/EP2012/004948; Mailing date May 3, 2013.

(Continued)

*Primary Examiner* — Anthony J Zimmer
(74) *Attorney, Agent, or Firm* — thyssenkrupp North America, Inc.

(57) ABSTRACT

An apparatus and a process are described for preparation of nitric acid from ammonia and oxygenous gas by the single pressure or dual pressure process, in which the oxidation of the ammonia used is accomplished by means of compressed process air which has been compressed in at least one compressor over a catalyst, and the nitrous gas formed by the oxidation is at least partly absorbed by water, forming nitric acid, and the unabsorbed residual gas is expanded for the purpose of recovering compressor work in at least one multistage residual gas turbine (1). The characteristic features of the process and the apparatus are that, at least during the startup and/or shutdown of the nitric acid plant, in the multistage residual gas turbine (1), a substream (3) of the medium (4) flowing through the multistage residual gas turbine (1) is withdrawn and that a substream (2) of the medium (4a) supplied to the multistage residual gas turbine (1) is optionally withdrawn upstream of the multistage residual gas turbine (1), and that the medium withdrawn is supplied to a chimney (5), the withdrawal of the substream (3) taking place between two or more residual gas turbine (Continued)

stages. This measure can effectively prevent freezing of the residual gas turbine.

17 Claims, 1 Drawing Sheet

(51) Int. Cl.
*B01J 7/00* (2006.01)
*C01B 21/26* (2006.01)

(56) References Cited

U.S. PATENT DOCUMENTS

| | | | | |
|---|---|---|---|---|
| 4,330,520 | A * | 5/1982 | Roller | C01B 21/26 423/392 |
| 4,869,890 | A * | 9/1989 | Adams | C01B 21/26 423/392 |
| 5,106,513 | A * | 4/1992 | Hong | F01K 3/188 210/749 |
| 7,258,849 | B2 * | 8/2007 | Dziobek | C01B 21/26 423/392 |
| 2005/0106092 | A1 * | 5/2005 | Dziobek | C01B 21/26 423/392 |

OTHER PUBLICATIONS

German Language International Search Report for International Patent Application No. PCT/EP2012/004948; Mailing date May 3, 2013.

* cited by examiner

PROCESS AND APPARATUS FOR PREPARATION OF NITRIC ACID

CROSS REFERENCE TO RELATED APPLICATIONS

This application is a U.S. National Stage Entry of International Patent Application Serial Number PCT/EP2012/004948, filed Nov. 30, 2012.

FIELD

The present invention relates to a process for preparing nitric acid, in the course of which, in the startup and shutdown of the plant, a selected control method for the residual gas turbine is used. The invention also relates to a correspondingly modified plant for preparation of nitric acid. The process according to the invention and the inventive plant permit problem-free startup and shutdown of nitric acid plants, including those plants equipped with high-performance residual gas expanders.

BACKGROUND

Nitric acid is an important commodity in the chemical industry and serves, for example, as the basis for production of fertilizers, explosives, and for nitration of organic substances in the production of dyes and disinfectants.

Since the early 20th century, nitric acid has been produced by the Ostwald process, on which large-scale industrial production has been based to date. This reaction is a catalytic reaction of ammonia. The nitrogen monoxide formed reacts to give nitrogen dioxide, from which reaction with water forms nitric acid which can be removed in trickle towers. This process is described in the publication "Anorganische Stickstoffverbindungen" [Inorganic Nitrogen Compounds] by Mundo/Weber, Carl Hanser Verlag Munich Vienna 1982, and in WO 01/68520 A1.

For preparation of nitric acid, ammonia $NH_3$ is generally first reacted with air to obtain nitrogen oxide NO, which is then oxidized up to nitrogen dioxide $NO_2$.

Subsequently, the nitrogen dioxide $NO_2$ thus obtained is absorbed in water to form nitric acid. In order that a maximum amount of the nitrogen dioxide $NO_2$ obtained is absorbed by water, the absorption is effected generally at elevated pressure, preferably at pressures between 4 and 14 bar.

The oxygen required for the conversion of the ammonia used as the raw material is generally supplied in the form of atmospheric oxygen. For the purpose of supply, the process air is compressed in a compressor and brought to a pressure appropriate both for the oxidation reaction and the absorption reaction.

Typically, the energy for compression of the air is obtained firstly by means of decompression in a residual gas expander of the residual gas leaving the absorption to ambient pressure, and secondly through the utilization of the heat released in the reactions. The nitric acid plants constructed in various designs are matched to the specific requirements for the site of each one.

Single pressure processes are used especially when the required daily production is low. In these cases, the nitric acid plant is preferably operated by the mono high pressure process or by the mono medium pressure process. In the mono high pressure process, the combustion of the ammonia and the absorption of the nitrogen oxides are effected at about the same pressure of >8 bar. The advantage of the mono high pressure process is that a compact design is ensured.

In the mono medium pressure process, the combustion of the ammonia and the absorption of the nitrogen oxides are effected at about the same pressure of <8 bar. The advantage of the mono medium pressure process is that an optimal combustion yield is ensured.

If, in contrast, high nominal capacities and/or relatively high acid concentrations are required, a nitric acid plant executed by the dual pressure process is the more economical solution. In the dual pressure process, the combustion of the ammonia used is accomplished at a first pressure, namely at a lower pressure compared to the absorption pressure. The nitrous gases formed in the combustion are generally brought to the second pressure, the absorption pressure, after cooling by means of nitrous gas compression.

The advantage of the dual pressure process is that the pressure stages are appropriate for the respective reactions and thus both an optimal combustion yield and a compact absorption are ensured.

In general, the plants for performance of the processes discussed above comprise at least one air compressor and at least one expansion turbine for the residual gas (also called "residual gas turbine") and at least one drive which provides the machine used with the compensation energy required for the operation thereof, for example a steam turbine or an electric motor.

Such plants are known, for example, from WO 2009/146758 A1 and WO 2011/054928.

In contrast to steady-state operation, in the startup and shutdown operation of nitric acid plants, the units present do not work under standard conditions and frequently require additional regulation.

In the course of startup from the switched-off/cold state, the nitric acid plant is generally first filled with air with the import of outside energy (for example outside steam and/or power) ("air operation"). The first emissions of $NO_x$ arise as soon as the absorption tower is filled with nitric acid from a reservoir vessel during the startup operation and the $NO_2$ gas present in the acid is blown out by the air, and in modern plants the $NO_x$ formed during the filling operation is emitted. With the ending of the filling operation, the $NO_x$ emission then also ceases at first, until the $NH_3$ oxidation in the nitric acid plant is started ("ignited"). After the ignition, the temperature and $NO_x$ concentration in the plant rise constantly to the steady-state operation value, and the individual plant parts can be operated as planned from a particular time.

In the shutdown of the nitric acid plant, the $NH_3$ oxidation is first stopped. The $NO_x$ concentration at the outlet from the absorption tower decreases constantly and the temperature falls in parallel. Here too, from a certain time, individual plant parts can no longer be operated as planned since the steady-state operation values can no longer be complied with.

U.S. Pat. No. 4,869,890 A and U.S. Pat. No. 4,330,520 A disclose a plant for preparation of nitric acid from ammonia and oxygenous gas, which comprises an air compressor, a residual gas turbine, a chimney and a bypass line which is arranged upstream of the residual gas turbine and through which the residual gas stream can be introduced directly into the chimney.

DE 102 11 964 A1 discloses a plant for preparation of nitric acid from ammonia and oxygenous gas, which comprises an air compressor, a residual gas turbine and a bypass or secondary line which is arranged upstream of the residual gas turbine and through which at least a substream can be passed directly into an offgas line.

GB 807,885 A discloses a plant for preparation of nitric acid from ammonia and oxygenous gas under pressure, which comprises an air compressor, a residual gas turbine and a bypass line which is arranged upstream of the residual gas turbine and through which at least a substream can be passed directly to a chimney. This document additionally states that, during the startup or operation of the nitric acid plant, a substream of the medium supplied to the residual gas turbine is withdrawn upstream of the residual gas turbine and supplied to a chimney.

In the operation of the nitric acid plant, it is desirable to achieve a high efficiency of the residual gas turbine in order to lower the operating costs. For this purpose, the inlet temperature of the medium which flows through the residual gas turbine during the startup or shutdown operation of the plant must be sufficiently high that the gases leaving the residual gas turbine do not freeze. Especially in the case of residual gas turbines with high efficiency, there is an increased risk of freezing, since a residual gas turbine with improved efficiency cools the medium which flows through it much more significantly for the same inlet temperature compared to a conventional residual gas turbine. However, it is not always possible to heat the medium which flows through the residual gas turbine to the required temperature in the course of startup and/or in the course of shutdown.

In contrast to normal operation of the plant, the inlet temperature of the medium flowing through the residual gas turbine is usually lower during startup and/or shutdown.

Therefore, the efficiency of the residual gas turbine is limited by the medium flowing through it in the course of startup and/or shutdown in order to prevent the freezing of the residual gas turbine during startup and/or shutdown.

SUMMARY

It is an object of the present invention to optimize the known single pressure and dual pressure processes for preparation of nitric acid such that the problems detailed above in the course of startup or shutdown of these plants can be avoided. It is a further object of the invention to provide plants for performance of such processes and to enable use of residual gas turbines with higher efficiency in order thus to lower the operating costs.

It is a further object of the present invention to enable, in the case of use of a conventional expander, colorless startup of nitric acid plants, since the residual gas is heated to such an extent that the residual gas cleaning can be put into operation at an early stage.

BRIEF DESCRIPTION OF THE DRAWINGS

The present disclosure is described in detail below with reference to the attached drawing FIGURE, wherein.

DETAILED DESCRIPTION

Figure 1:
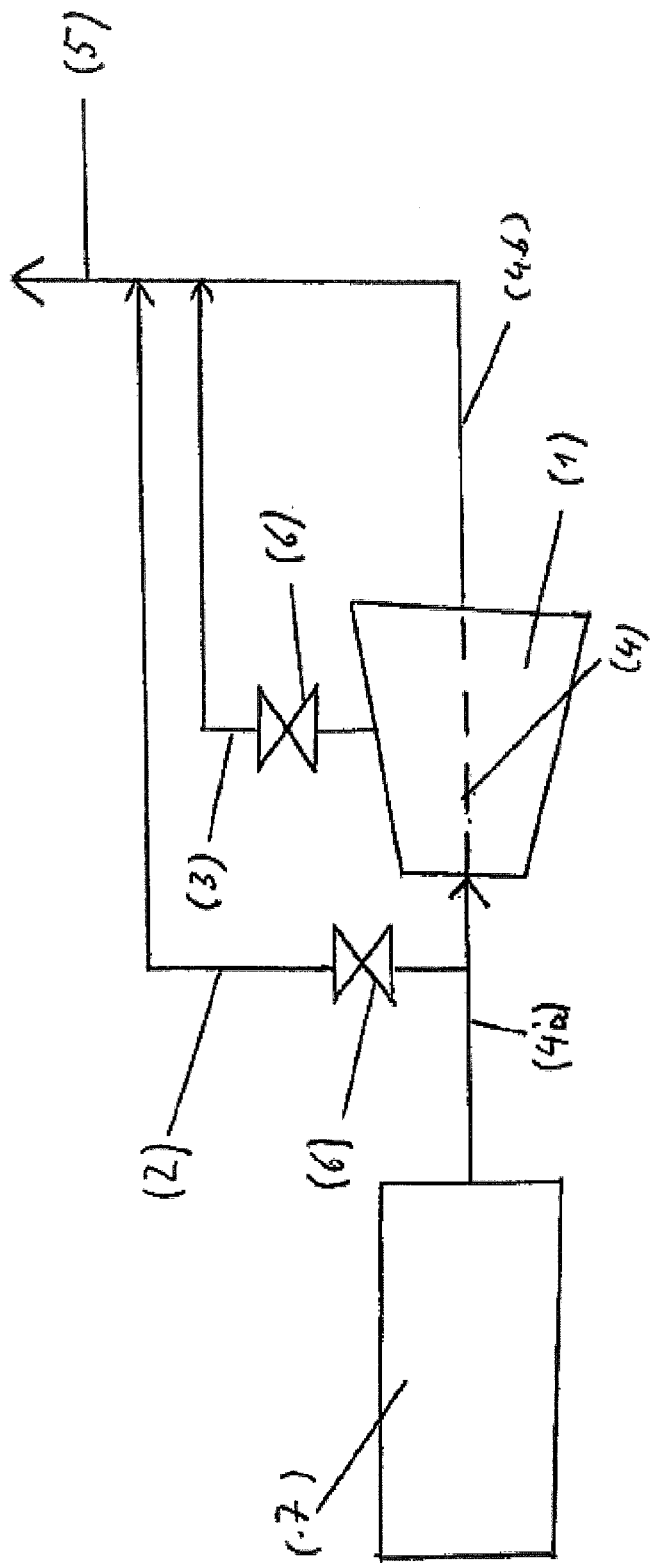
FIG. 1 is a schematic diagram of an embodiment of a partial nitric acid plant for practicing an embodiment of a process for preparing nitric acid, as disclosed herein.

The invention relates to a process for preparing nitric acid from ammonia and oxygenous gas by the single pressure or dual pressure process, in which the oxidation of the ammonia used is accomplished by means of compressed process air which has been compressed in at least one compressor over a catalyst, and the nitrous gas formed by the oxidation is at least partly absorbed by water, forming nitric acid, and the unabsorbed residual gas is expanded for the purpose of recovering compressor work in at least one multistage residual gas turbine (1), characterized in that, at least during the startup and/or the shutdown of the nitric acid plant, a substream (3) of the medium (4) flowing through the multistage residual gas turbine (1) is withdrawn in the multistage residual gas turbine (1) and in that, optionally, a substream (2) of the medium (4a) supplied to the multistage residual gas turbine (1) is withdrawn upstream of the multistage residual gas turbine (1), and in that the medium withdrawn is supplied to a chimney (5), the withdrawal of the substream (3) taking place between two or more residual gas turbine stages In the process according to the invention, a substream (3) of the medium (4) flowing through the multistage residual gas turbine (1) is withdrawn therefrom and supplied to the chimney (5) on the exit side of the residual gas turbine (1). The withdrawal of substream (3) takes place between two or more residual gas turbine stages.

The design of the residual gas turbine (1) used in accordance with the invention corresponds to the basic idea of a steam turbine with extraction, called an extraction turbine.

During the withdrawal of the substream (3), in the case of the multistage residual gas turbine (1), the efficiency of the residual gas expander stages which follow the withdrawal is lowered by the lower flow. The withdrawal rate can be controlled by a withdrawal device (6), for example by a manual valve and/or regulating valve; another option is automated control of the withdrawal rate, for example by means of a computer-controlled valve.

In addition, the residual gas temperature in the outlet of the residual gas turbine (1) and/or in the chimney (5) can be set to a desired temperature by the measures of the process according to the invention.

In a further variant of the process according to the invention, upstream of the multistage residual gas turbine (1), a residual gas turbine bypass (2) likewise reduces the amount of the medium (4a) which is supplied to the residual gas turbine (1) and passes it into the chimney (5).

This likewise has the effect that the reduced flow through the multistage residual gas turbine (1) reduces the efficiency, and reduced expansion takes place in the multistage residual gas turbine (1), as a result of which the exit temperature of the medium from the turbine is increased. This likewise avoids the risk of freezing of the multistage residual gas turbine (1).

The mode of operation of the nitric acid plant according to the invention is effected principally in the startup and/or shutdown phase of the plant. However, during steady-state operation too, the measures of the process according to the invention can be employed to regulate the operating parameters in the plant.

The process according to the invention produces nitric acid having a concentration in the range from 40 to 76% from ammonia and oxygenous gas by the single pressure or dual pressure process, in which the combustion of the ammonia used is accomplished by means of compressed process air which has been compressed in at least one compressor.

The nitrous gas formed by the oxidation is at least partly absorbed by water, forming nitric acid. The unabsorbed residual gas, for the purpose of recovering compression work, is expanded in one or else more than one residual gas turbine, also called gas expanders, preferably to ambient pressure.

The oxygenous gas used is frequently air, but it may also be advantageous to use oxygen-enriched air.

The invention relates to a process which is performed in a plant comprising at least one residual gas turbine (1) having at least two stages.

The invention relates especially to a process in which a portion of the medium (4a) provided for flow through the multistage residual gas turbine (1) is branched off by a bypass as substream (2) upstream of the multistage residual gas turbine (1) and removed through the bypass into the chimney (5).

The invention relates especially to a process in which a multistage residual gas turbine (1) is used, and a portion of the medium (4) flowing through the residual gas turbine (1), after leaving one turbine stage, is branched off by a bypass as substream (3) before the downstream turbine stage and removed through the bypass into the chimney (5).

In a particularly preferred embodiment of the process according to the invention, the temperature of the medium (4b) leaving the multistage residual gas turbine serves as a control parameter for a withdrawal device (6), preferably a valve, in order to adjust the amount of the proportion of medium removed through the bypass as substream (2, 3).

The invention relates especially to a process which is performed in a plant comprising at least one absorption device for absorption of nitrous gas in water.

The invention further provides an apparatus for performance of a process as described above.

This apparatus comprises a drive which provides the machine used with the compensation energy required for the operation thereof, for example a steam turbine or an electric motor, at least one air compressor, at least one residual gas turbine (1) and at least one chimney (5), and at least one bypass line arranged in the multistage residual gas turbine (1) for withdrawal of at least one substream (3) of the medium (4) which flows through the multistage residual gas turbine (1) between two or more residual gas turbine stages and optionally upstream of the multistage residual gas turbine (1) for withdrawal of at least one substream (2) of the medium (4a) supplied to the multistage residual gas turbine (1) and for introduction of the substream (2, 3) into the chimney (5).

With the aid of the process according to the invention, it is possible to start up and shut down plants for preparation of nitric acid rapidly and in a material-protective manner, without any risk of freezing of the residual gas turbine(s) (1). Especially in the case of use of residual gas turbines (1) with high efficiency, the process according to the invention gives a high degree of operational reliability, since freezing of the residual gas turbine (1) can be reliably avoided.

FIG. 1 describes a variant of the process according to the invention or a variant of part of the inventive apparatus in schematic form.

This shows a non-detailed diagram of a partial nitric acid plant (7) which opens into a multistage residual gas turbine (1). A substream (2, 3) of the medium (4) flowing through the multistage residual gas turbine (1) or of the medium (4a) supplied to the multistage residual gas turbine is withdrawn by means of bypasses upstream of and in the residual gas turbine (1), and is supplied to the chimney (5). The withdrawal rate can be regulated by a valve (6). The medium (4b) leaving the multistage residual gas turbine is likewise supplied to the chimney (5).

The invention claimed is:

1. A process for preparing nitric acid from ammonia and oxygen-containing gas in a nitric acid manufacturing plant, comprising:

compressing air with at least one compressor;
oxygenating ammonia over a catalyst with the compressed air to form nitrogen dioxide gas;
dissolving at least part of the nitrogen dioxide gas in water to form nitric acid;
feeding residual gas remaining after said dissolving step into at least one multistage residual gas turbine, the fed residual gas being a stream of undissolved compressed nitrogen dioxide gas and air;
driving the at least one multistage residual gas turbine by the expansion of the residual gas entering the at least one multistage residual gas turbine, so as to recover stored energy from the previously compressed residual gas;
withdrawing, from within the at least one multistage residual gas turbine between at least two stages thereof, a first substream of the residual gas flowing through the at least one residual gas turbine during at least one of the startup or shutdown of the nitric acid manufacturing plant; and
directing the withdrawn substream of residual gas to a chimney.

2. The process of claim 1, further comprising:
withdrawing a second substream of the residual gas upstream of the at least one multistage residual gas turbine; and
directing the second substream of residual gas to the chimney.

3. The process of claim 1, further comprising:
withdrawing from the at least one multistage residual gas turbine a second substream of the residual gas flowing there through; and
directing the withdrawn second substream to the chimney, wherein the chimney is disposed on an exit side of the at least one multistage residual gas turbine.

4. The process of claim 1, further comprising:
withdrawing a portion of the residual gas flowing through the at least one multistage residual gas turbine as a second substream of residual gas, said splitting off of the second substream occurring after the residual gas exits one of a plurality of turbine stages in the at least one multistage residual gas turbine; and
directing the withdrawn second substream of residual gas to the chimney.

5. The process of claim 1, further comprising:
controlling a flow rate of the residual gas in the first substream by a selectably controllable gas withdrawal device.

6. The process of claim 1, further comprising:
controlling a temperature of the residual gas at an exit of at least one of the at least one multistage residual gas turbine or chimney, by a flow rate of the residual gas in the first substream.

7. The process of claim 1, further comprising:
upstream of the at least one multistage residual gas turbine, splitting off a portion of the of the residual gas stream flowing to the at least one multistage residual gas turbine, the splitting off being performed by a gas bypass; and
channeling the split-off residual gas flowing through the gas bypass to the chimney for removal from the nitric acid plant.

8. The process of claim 2, further comprising:
measuring a temperature of the expanded residual gas exiting the at least one multistage residual gas turbine through a primary gas exit outlet of the at least one multistage residual gas turbine; and controlling by way of a withdrawal device the flow rate or residual gas withdrawn through at least one of the first or second substreams based on a control parameter comprising the measured temperature.

9. The process of claim 8, further comprising:
controlling the withdrawal device and the rate of residual gas flowing through at least one of the first or second substreams based on the measured temperature.

10. The process of claim 1, wherein the process is performed in a manufacturing plant comprising at least one absorption device for absorption of nitrogen dioxide gas in water.

11. A process for preparing nitric acid from ammonia and oxygen-containing gas in a nitric acid manufacturing plant, comprising:
compressing air with at least one compressor;
oxygenating ammonia with the compressed air to form nitrogen dioxide gas;
dissolving at least part of the nitrogen dioxide gas in water to form nitric acid;
feeding residual gas remaining after said dissolving step into at least one multistage residual gas turbine, the fed residual gas being a stream of undissolved compressed nitrogen dioxide gas and air;
driving the at least one multistage residual gas turbine by the expansion of the residual gas entering the at least one multistage residual gas turbine, so as to recover stored energy from the previously compressed residual gas;
withdrawing, from within the at least one multistage residual gas turbine between at least two stages thereof, a first substream of the residual gas flowing through the at least one residual gas turbine during at least one of the startup or shutdown of the nitric acid manufacturing plant; and
directing the withdrawn substream of residual gas to a chimney.

12. The process of claim 11, further comprising:
withdrawing a second substream of the residual gas upstream of the at least one multistage residual gas turbine; and
directing the second substream of residual gas to the chimney.

13. The process of claim 11, further comprising:
withdrawing from the at least one multistage residual gas turbine a second substream of the residual gas flowing there through; and
directing the withdrawn second substream to the chimney, wherein the chimney is disposed on an exit side of the at least one multistage residual gas turbine.

14. The process of claim 11, further comprising:
withdrawing a portion of the residual gas flowing through the at least one multistage residual gas turbine as a second substream of residual gas, said splitting off of the second substream occurring after the residual gas exits one of a plurality of turbine stages in the at least one multistage residual gas turbine; and
directing the withdrawn second substream of residual gas to the chimney.

15. The process of claim 11, further comprising:
controlling a flow rate of the residual gas in the first substream by a selectably controllable gas withdrawal device.

16. The process of claim 11, further comprising:
controlling a temperature of the residual gas at an exit of at least one of the at least one multistage residual gas turbine or chimney, by a flow rate of the residual gas in the first substream.

17. The process of claim 11, further comprising:
upstream of the at least one multistage residual gas turbine, splitting off a portion of the of the residual gas stream flowing to the at least one multistage residual gas turbine, the splitting off being performed by a gas bypass; and
channeling the split-off residual gas flowing through the gas bypass to the chimney for removal from the nitric acid plant.

* * * * *